United States Patent
Doi et al.

(10) Patent No.: US 7,023,641 B2
(45) Date of Patent: Apr. 4, 2006

(54) RECORDING CURRENT CONTROL METHOD AND MAGNETIC DISK DRIVE

(75) Inventors: Takeshi Doi, Fujisawa (JP); Masayoshi Shimokoshi, Fujisawa (JP); Hitoshi Yoshida, Fujisawa (JP)

(73) Assignee: Hitachi Global Storage Technologies Japan, Ltd., Odawara (JP)

( * ) Notice: Subject to any disclaimer, the term of this patent is extended or adjusted under 35 U.S.C. 154(b) by 0 days.

(21) Appl. No.: 10/671,806

(22) Filed: Sep. 26, 2003

(65) Prior Publication Data

US 2004/0184177 A1    Sep. 23, 2004

(30) Foreign Application Priority Data

Mar. 19, 2003    (JP) .............................. 2003-074811

(51) Int. Cl.
*G11B 5/02* (2006.01)

(52) U.S. Cl. ........................ 360/68; 360/39; 360/46; 360/55; 360/61; 360/25; 360/31

(58) Field of Classification Search .................. 360/68, 360/46, 67, 61, 63; 327/110, 108
See application file for complete search history.

(56) References Cited

U.S. PATENT DOCUMENTS

| | | | |
|---|---|---|---|
| 6,118,614 A * | 9/2000 | Lee | 360/75 |
| 6,175,456 B1 * | 1/2001 | Yun | 360/46 |
| 6,445,531 B1 * | 9/2002 | Gaertner et al. | 360/78.06 |
| 6,798,598 B1 * | 9/2004 | Suzuki et al. | 360/68 |
| 2002/0105747 A1 | 8/2002 | Okazaki et al. | |
| 2002/0105748 A1 | 8/2002 | Lamberts et al. | |

FOREIGN PATENT DOCUMENTS

| | | | |
|---|---|---|---|
| JP | 08-096309 | * | 4/1996 |
| JP | 10-334402 | | 12/1998 |
| JP | 2000-048312 | * | 2/2000 |

* cited by examiner

*Primary Examiner*—David Hudspeth
*Assistant Examiner*—Natalia Figueroa
(74) *Attorney, Agent, or Firm*—Townsend and Townsend and Crew LLP

(57) ABSTRACT

In a magnetic disk drive, a writing element and its surrounding area thermally expand due to the heat generated by a write head coil. The transient phenomenon of such thermal expansion may invoke the transient phenomenon of inadequate writing capacity, thereby causing a writing error at an early stage of a write operation. Control is provided which increases/decreases either or both the write current to be applied to a write head and the amount of its overshoot on an individual sector basis during a writing sequence.

12 Claims, 8 Drawing Sheets

RECORDING CURRENT CONTROL METHOD AND MAGNETIC DISK DRIVE

CROSS-REFERENCE TO RELATED APPLICATIONS

This application claims priority to Japanese Patent Application No. 2003-074811, filed Mar. 19, 2003, the entire disclosure of which is incorporated by reference for all purposes.

BACKGROUND OF THE INVENTION

The present invention relates generally to magnetic disk drives, and more particularly to the control of operating parameters during a write (recording) operation.

Magnetic disk drives are normally connected to a computer, server, or other electronic device, and are frequently used as large-capacity external storage devices. Performance demands are particularly high in a server environment, and a magnetic disk drive connected to a server is required to achieve data transfer at a high speed and exhibit high reliability. The demands on data write frequency and storage capacity are on the increase. To meet high performance requirements at a specified ambient temperature while offering an increased density, it is naturally demanded that the magnetic disk drive write information properly.

When the magnetic disk drive writes data or other electronic information onto a magnetic disk medium, it is essential that the distance between the magnetic head and magnetic disk medium be minimized. In reality, the magnetic head should be positioned as close as possible to the magnetic disk medium by minimizing the floating height of the magnetic slider on which the magnetic head is mounted.

A technology disclosed by Japanese Patent Laid-open No. 5-20635 forms a resistive element in the magnetic head or magnetic slider and energizes the resistive element to cause the magnetic head element to protrude, thereby reducing the gap between the magnetic pole end and magnetic disk surface.

When the above conventional technology is taken into consideration, there is no alternative but to determine the spacing between the write head element and magnetic disk medium surface by predicting the thermal expansion and protrusion (thermal protrusion) of the magnetic head. Consequently, at an early stage of a write operation prior to magnetic head thermal expansion and protrusion, the spacing between the write head element and magnetic disk medium has to be several nanometers greater than after a predefined degree of thermal expansion is achieved. It means that the writing capacity may be inadequate at an early stage of a write operation. The writing capacity is insufficient especially when the magnetoresistivity (hereinafter abbreviated to Hc) of the magnetic disk medium is great.

A technology disclosed by Japanese Patent Laid-open No. 10-334402 provides a technology for causing an adequately large write current to flow to the write head so as to perform a write at a low temperature. Further, a technology disclosed by Japanese Patent Laid-open No. 2002-237004 controls the write current in accordance with the ambient temperature by changing the write current when a certain threshold temperature is exceeded.

SUMMARY OF THE INVENTION

In short, the inventors have recognized problems not recognized or addressed by the conventional technologies, and have addressed these problems to improve the reliability of writing. The inventors have recognized the transient phenomenon of the thermal expansion resulting from write current application and the fact that the write head coil heats, subjecting the coil and its surrounding area to deformation due to thermal expansion and changing the floating height and other operating environments of the write head.

For example, when data is written into a target sector, which is reached after the magnetic head is positioned on a specified track, the magnetic head is lifted too high. Therefore, the resulting data write may be inadequate so that a read error occurs when an attempt is made later to read the written data. Further, when the write current begins to flow to the magnetic head the moment the magnetic head arrives at a target sector, a write operation begins with the target sector although the floating height of the magnetic head is too high. When several sectors subsequent to the target sector are being written into, the flow of the write current heats the magnetic head write coil and its surrounding area so that the floating height of the magnetic head decreases due to magnetic head thermal expansion. Therefore, the write operation is performed normally after several sectors subsequent to the target sector are written.

The present invention recognizes and addresses problems of unreliability due to changes in the magnetic head's floating height due to thermal effects by controlling the write current applied to a write head coil.

In this context, it is recognized that the write current is being rapidly modulated during any write operation, and references to controlling or applying a write current are understood to apply to an averaged value (e.g., root-mean-square value) over many of the data transitions (writing 1's and 0's).

In one aspect, the invention provides a method of controlling a write current in a magnetic disk drive. The method comprises receiving a write command to initiate a present write operation and controlling the current applied to the write head coil depending on whether a predetermined period of time has elapsed since a most recent write operation terminated. If a predetermined period of time has elapsed since a most recent write operation terminated, a given write current is applied to the write head coil at the beginning of the present write operation, and then decreased during the write operation so that the write current is less than the given write current at the end of the write operation. If the predetermined period of time has not elapsed since the most recent write operation terminated, a write current less than the given write current is applied at the beginning of the present write operation.

The applied write current can be decreased smoothly over the write operation, or can transition from a first higher value to a second lower value, where the first and second values are maintained generally constant over significant portions of the write operation. Thus, errors may be reduced or eliminated by writing the first several sectors with the write current increased, and writing the subsequent sectors with the write current decreased.

In another aspect of the invention, a write operation is started, beginning with a target sector, with a relatively large write current setting employed to provide a stronger magnetic field. The write operation is performed in this manner while heating the coil. The write current is reduced later when a predetermined sector is reached or a predetermined period of time elapses. The normal write current setting is relatively raised in accordance with the floating height of the magnetic head for the start of a write. When a write operation begins with a target sector, the above relatively high write current setting is used. The write current may be reduced later when a predetermined sector is reached or a predetermined period of time elapses.

In another aspect, the invention provides a magnetic disk drive comprising a magnetic disk that rotates during operation, a write head having a coil through which a write current is passed during a write operation, and a write current control circuit that causes the write current to decrease during a write operation so that for an initial portion of the write operation, the write current is higher than the write current for an ending portion of the write operation.

In another aspect of the invention, the normal write operation is performed while the write coil is energized at a relatively high write current setting to heat the magnetic head write coil and its surrounding area and decrease the floating height of the magnetic head.

A further understanding of the nature and advantages of the present invention may be realized by reference to the remaining portions of the specification and the drawings.

DESCRIPTION OF SPECIFIC EMBODIMENTS

As will be described in greater detail below, embodiments of the invention provide for controlling the increase/decrease in the write current or overshoot for individual information segments. In other words, the write capacity is increased for individual information segments. The individual information segments are divisions into which the information to be written is divided. A sector is a typical example of an information segment.

The normal write current or overshoot setting may be relatively low. However, the write current or overshoot is preferably increased at an early stage of a write operation. The write current or overshoot may be decreased after a specified sector is written. The normal write current or overshoot setting may be relatively high. However, the write current or overshoot is preferably decreased at a later stage of a write operation, such as after a specified sector is written.

Some embodiments provide a threshold setup for specifying whether or not to increase/decrease the write current or overshoot. If no write operation is performed for a predetermined period, the write current or overshoot would be increased at the end of the predetermined period, so as to define the level when the write current is first applied, and then the write current would be decreased at a later time. An alternative is to start a write operation with the write current or overshoot increased and then continue with the operation with the write current or overshoot decreased.

Embodiments of the present invention will now be described with reference to the accompanying drawings.

Figure 6:
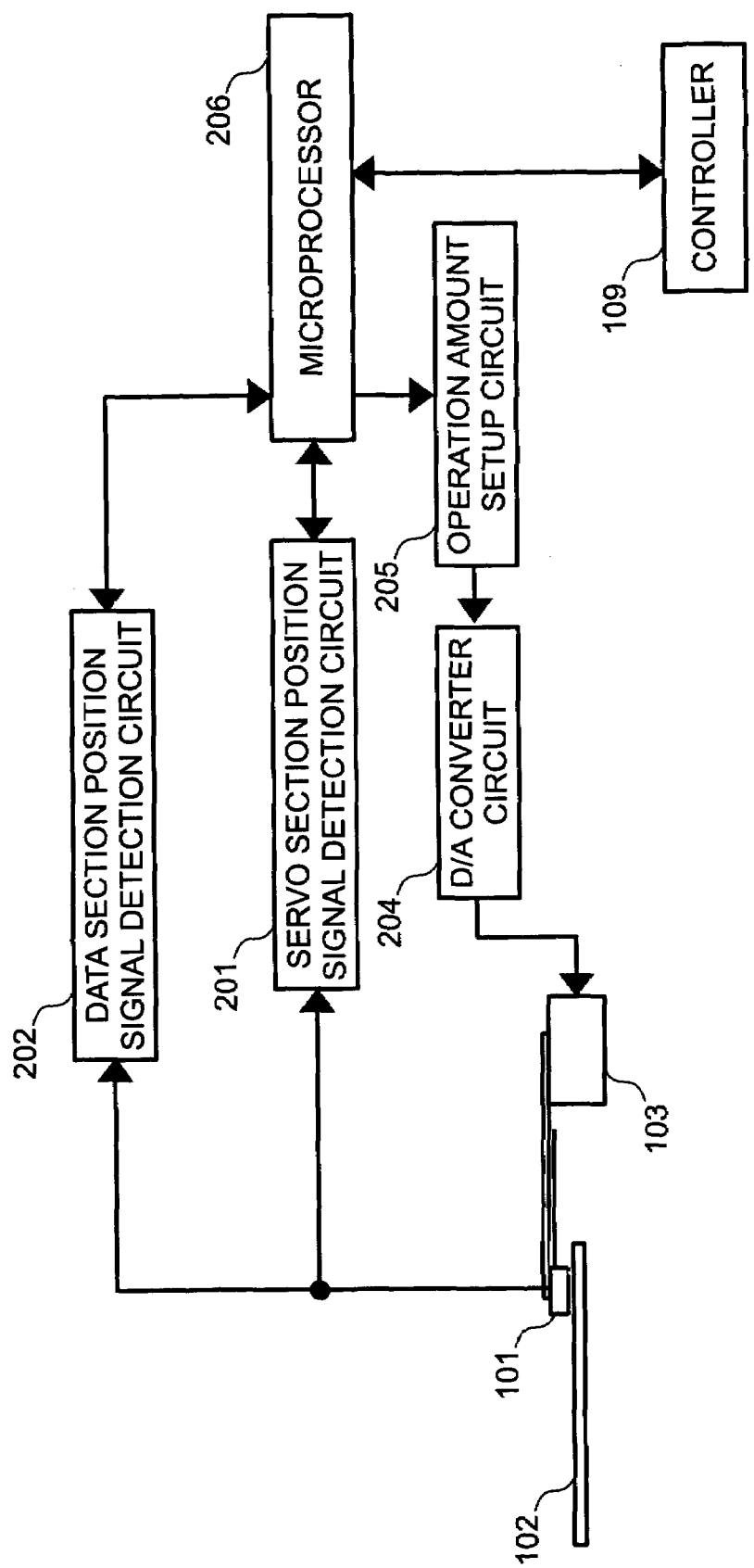
FIG. 6 is a block diagram that illustrates one embodiment of a positioning system of a magnetic disk drive according to the present invention.
Figure 7:
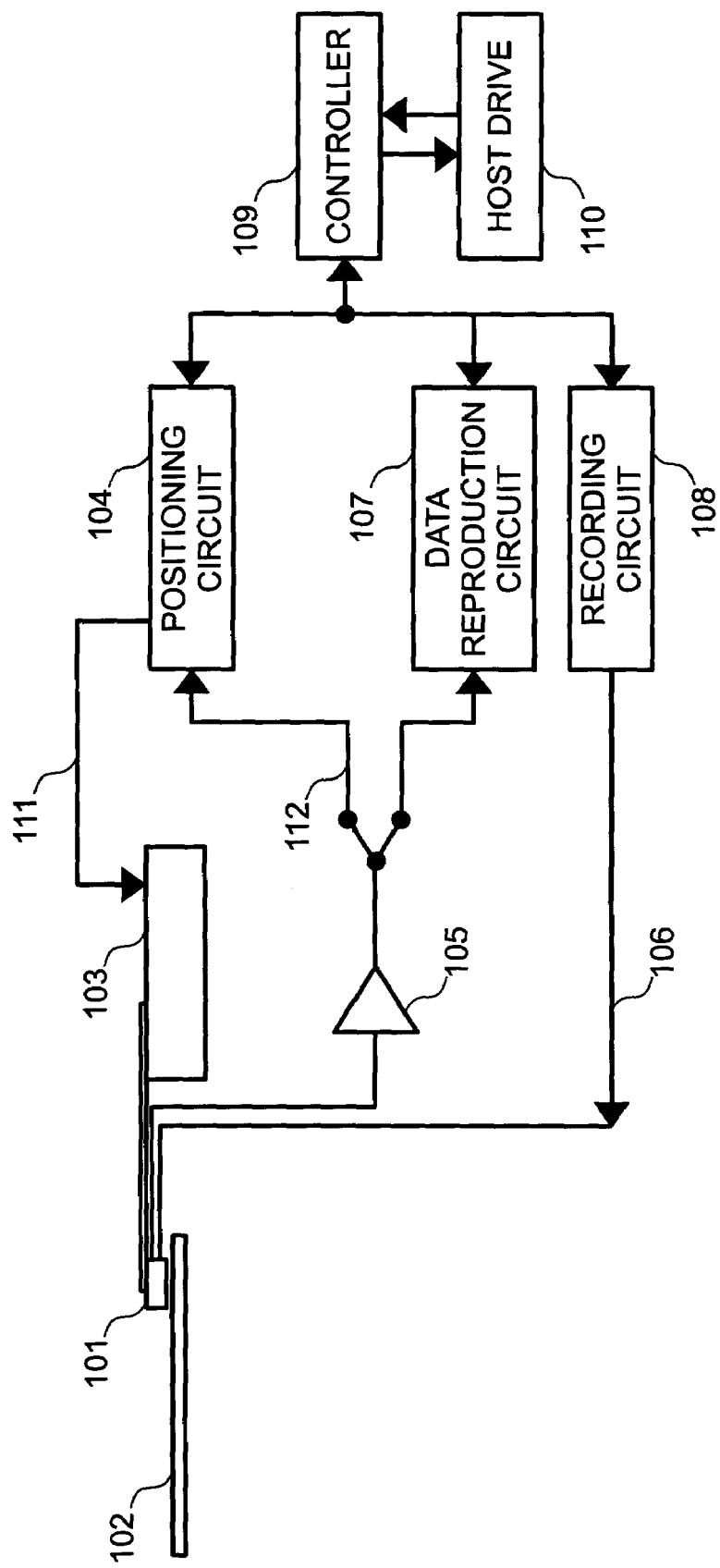
FIG. 7 is a block diagram of the entire magnetic disk drive according to the embodiment shown in FIG. 6.
Figure 8:
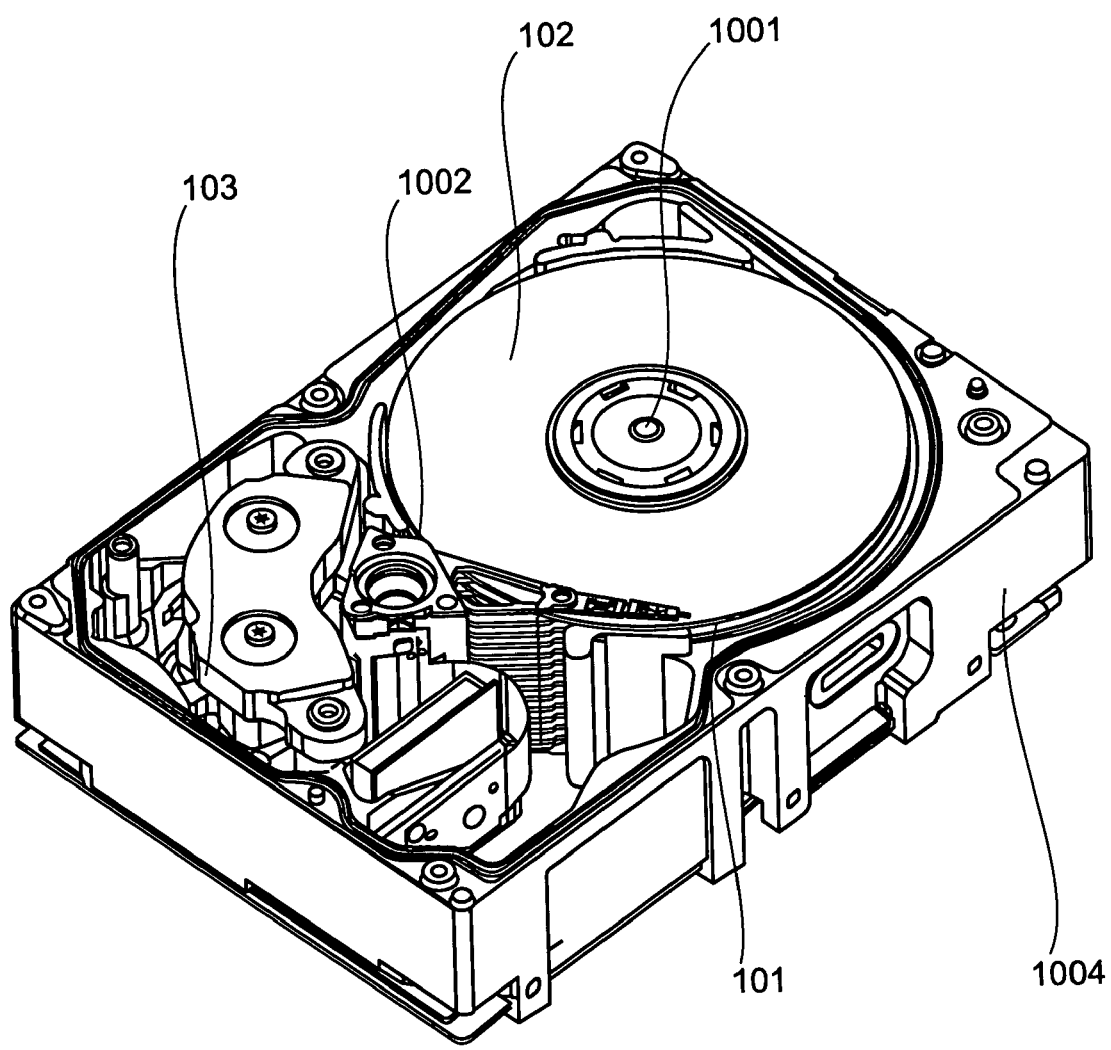
FIG. 8 is a perspective view illustrating the overall configuration of one embodiment of a magnetic disk drive.

In FIGS. 6, 7, and 8, reference numeral 102 denotes a magnetic disk medium; 1001, a spindle motor; 101, a magnetic head; 103, an actuator; 104, a positioning circuit; 105, an amplifier; 106, a write signal; 107, a data read (reproducing) circuit; 108, a write circuit; 109, a controller; 110, a host device; 111, a position control signal; 112, a read signal; 201, a servo section position signal detection circuit; 202, a data section position signal detection circuit; 204, a D/A converter circuit; 205, an operation amount setup circuit; 206, a microprocessor; 1002, a magnetic head support mechanism including a head arm; and 1004, a hermetically sealed housing. In FIG. 8, a cover (not shown) is removed from a principal surface of the enclosure 1004 to expose internal parts to view.

The magnetic disk drive for magnetically writing information usually has a plurality of writing surfaces. It should be noted, however, that the present invention is applicable to magnetic disk drives even when it has only one writing surface. The spindle motor 1001 rotates the magnetic disk medium 102 at a controlled constant angular speed. The magnetic head 101, which faces the magnetic disk medium 102, detects position information. The position information for positioning the magnetic head 101 at a desired position is read by the magnetic head 101, and fed to the microprocessor 206 via the servo section position signal detection circuit 201 and data section position signal detection circuit 202. That is, the target position dictated by the controller 109 and the position signal fed from the position signal detection circuits 201, 202 are sent to the microprocessor 206. The microprocessor 206 in the magnetic disk drive exercises a following control function to ensure that the magnetic head 101 follows tracks on the magnetic disk medium 102.

Figure 1:
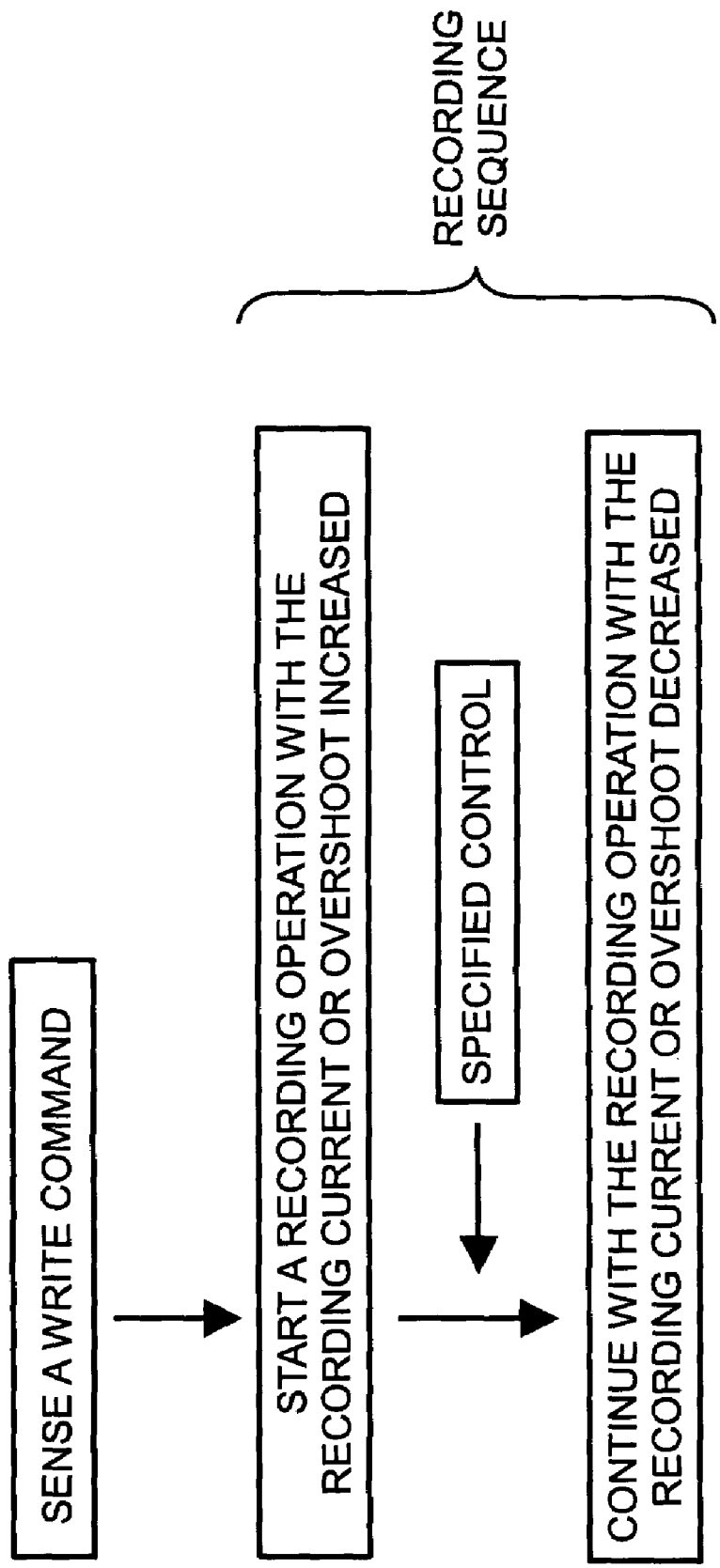
FIG. 1 is a flowchart schematizing one embodiment of the present invention.

FIG. 1 is a flowchart schematizing one embodiment of the present invention. The controller 109 in the magnetic disk drive recognizes a write command from the host device 110, increases the write current or overshoot, and performs a write operation under specified control. After completing a write operation for specified information segments, the controller 109 decreases the write current or overshoot and continues with the write operation. When the writing of necessary information is completed, the controller 109 terminates the write operation.

The write sequence begins upon receipt of a write command, and terminates upon completion of information writing. The write circuit 108 shown in FIG. 7 controls the write current for a write head, which is included in the magnetic head 101. The controller 109 sets a register value for the write circuit 108 (preamplifier) in order to control the value of the write current and the amount of overshoot.

Figure 2:
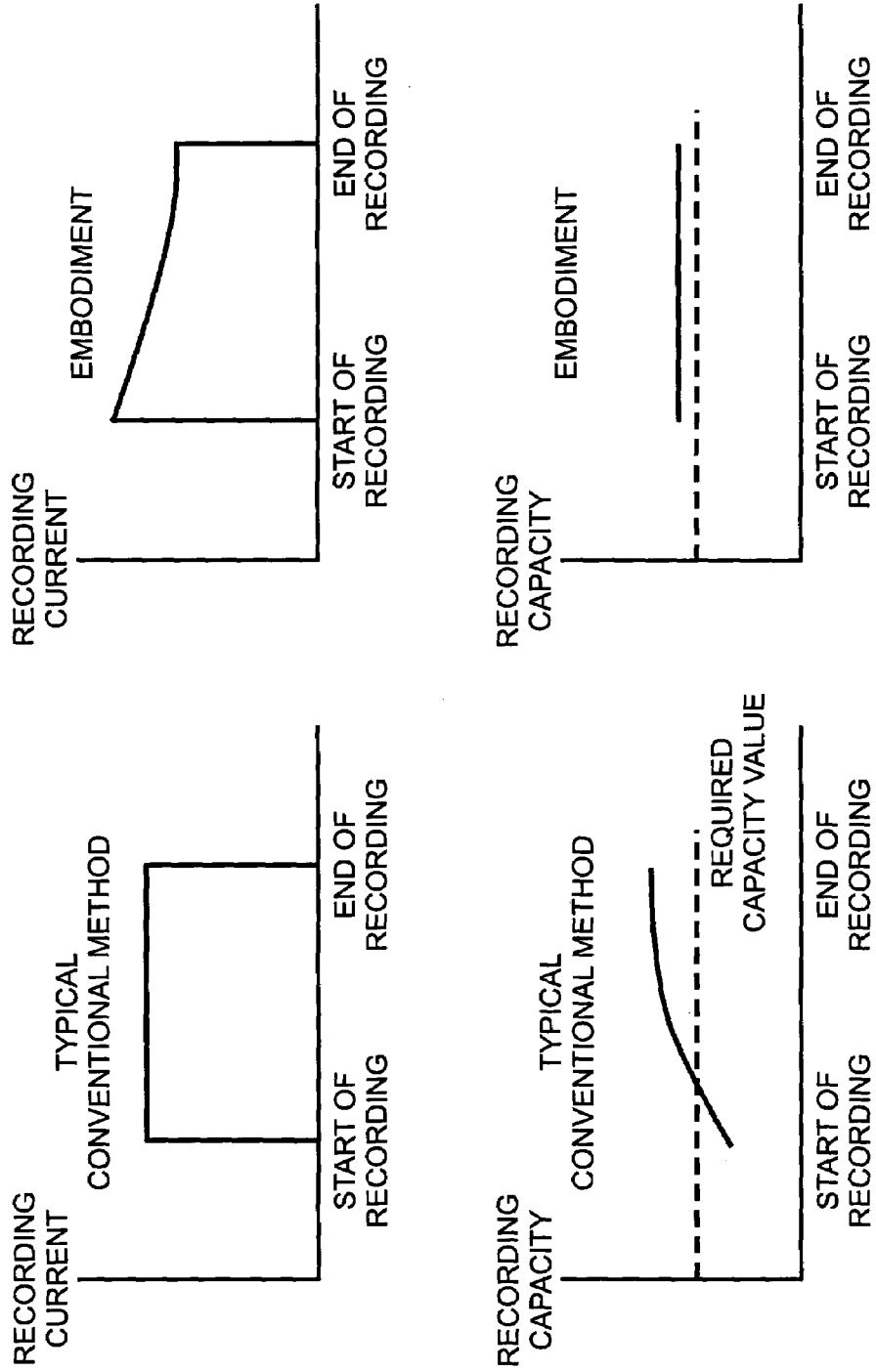
FIG. 2 is a set of conceptual diagrams illustrating write operations that are performed under specified control.

FIG. 2 is a set of conceptual diagrams illustrating write operations that are performed under specified control. The information transferred from the host device 110 to the magnetic disk drive is subjected to a predetermined conversion process in an electronic circuit within the magnetic disk drive, and written into one or more information segments such as sectors. As indicated in a typical conventional method in FIG. 2, a conventional information write operation is performed by applying a write current having a fixed root-mean-square value to the coil of the write head. When the track width is adequate and the higher harmonic used for the write current has a low frequency, the transient phenomenon of the writing capacity does not cause a practical problem.

However, when the track width is decreased with the higher harmonic frequency raised in order to achieve high-density writing, the inventors finds that the write operation for the leading sector targeted for information writing is not adequate. When control is exercised to increase the write current at an early stage of a write operation as indicated in an embodiment shown in FIG. 2, the write operation performed for the leading sector is adequate so that high-density information writing is achieved. The horizontal axis represents the time.

The operation performed between the start of writing and the end of writing takes several tens of microseconds to one millisecond. The early stage of the write operation is typically a period of several tens of microseconds subsequent to the start of writing. The above control may be exercised by an electronic circuit in the magnetic disk drive or the host device 110 shown in FIG. 6 or 7. The electronic circuit is composed wholly or partly of an IC, LSI, or other similar circuit.

The write current may also be increased/decreased by increasing/decreasing the amount of overshoot. The write current indicated in FIGS. 2 and 3 includes a write current increase/decrease that is brought about by increasing/decreasing the amount of overshoot.

The write current supplied to the write head coil of the magnetic head 101 is in fact a high-frequency analog current containing an overshoot or undershoot. When a predetermined preamplifier is furnished and the register value specified for the preamplifier is set, the overshoot/undershoot varies with the sector. Further, the write current can be increased/decreased by increasing/decreasing the root-mean-square value of the high frequency. The root-mean-square value can also be increased/decreased by setting the register value. As described above, the writing capacity can be adjusted by issuing a command at an arbitrary time during a writing sequence.

The above control technology is preferably incorporated, while considering the reliability, into the magnetic disk drive's writing sequence in which the magnetic disk drive receives a write command from the host device 110 and records a certain amount of information into one or more sectors. Therefore, the electronic circuit of the magnetic disk drive is provided with a timer for measuring the time and a counter for measuring the number of times a write process is interrupted (neither of these circuit components is shown).

Figure 3:
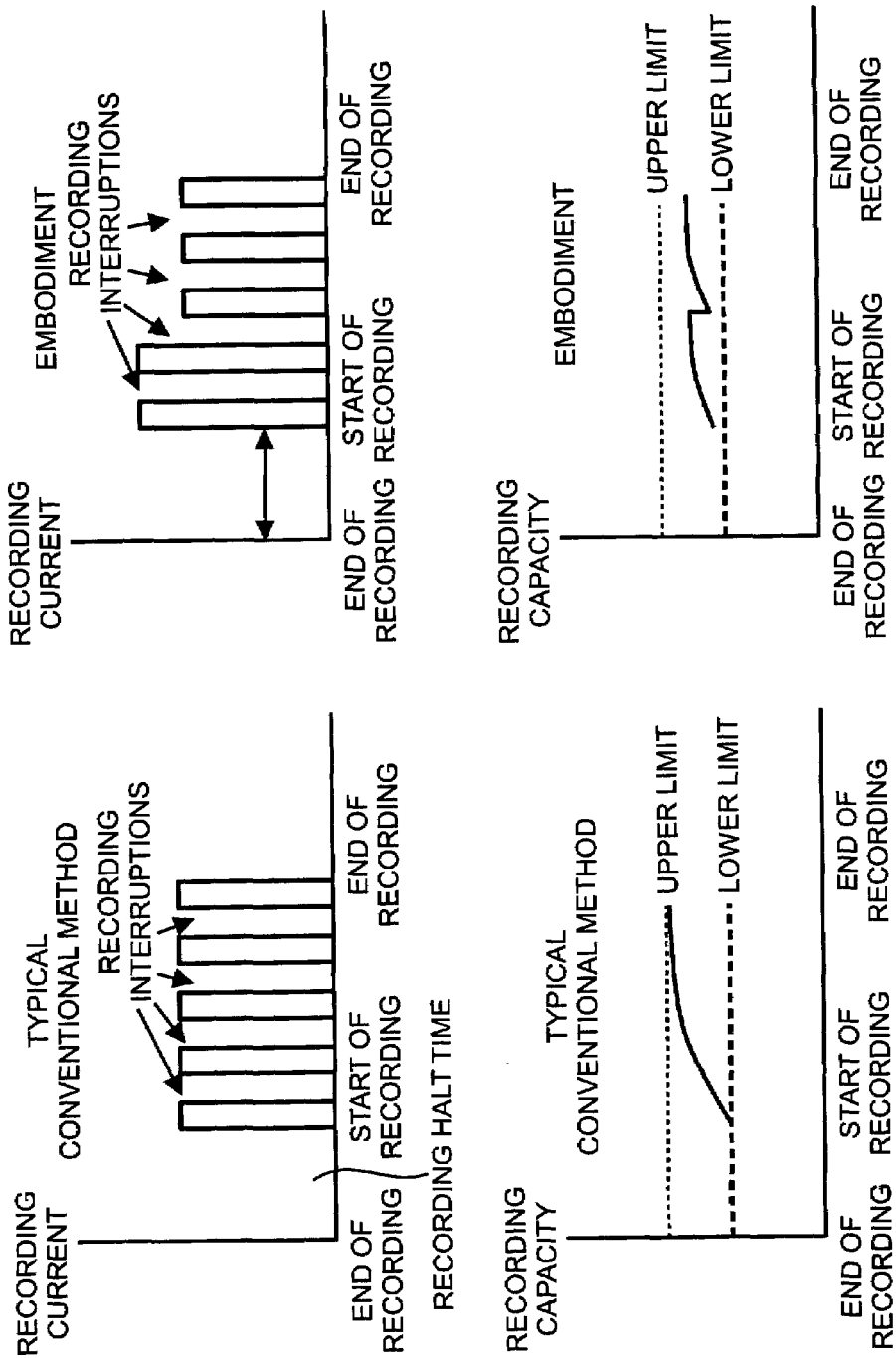
FIG. 3 illustrates the details of write operations shown in FIG. 2.

FIG. 3 illustrates the details of write operations shown in FIG. 2. The write halt time is the interval between the instant at which the last write operation was completed and the instant at which a new write command is received. Although intermittently generated rectangular waves are depicted as the flows of the write current, each rectangular wave corresponds to the write current flow to one sector. In reality, however, the write command execution is interrupted by an interrupt process even when a write command is being executed (typical conventional method). The reason is that the servo section representing the position information and the sync section representing the information segments in a track on the magnetic disk medium are protected from being damaged by a write operation. In the typical conventional method, the transient phenomenon of the writing capacity did not cause a practical problem for the reason described earlier.

The magnetic disk drive according to the embodiment of the present invention uses the above timer to measure the time interval between the instant at which a write command terminates and the instant at which the next write command arrives. If a predetermined threshold value (e.g., 1 millisecond) is exceeded by the measured time interval, the magnetic disk drive performs setup so as to increase the write current for the next write. The time measurement sequence may stop at the time of such setup. An interrupted write operation can be recognized by determining whether the timer is operating or not. When this control is exercised, the write current can be controlled without being affected by the transient phenomenon of the writing capacity.

The magnetic disk drive according to the embodiment of the present invention uses the above counter to measure the number of times a write operation is interrupted. If a predetermined value (e.g., 10) is exceeded by the measured number, the magnetic disk drive decreases the write current. Setup may be performed so as to revert to the previous write current value. When the write current is decreased as described above, the magnetic disk drive stops counting the number of write operation interruptions and resets the counter.

The above functions are incorporated into the electronic circuit of the magnetic disk drive so as to execute a received write command with the write current increased if the elapsed time from the end of the last write operation is longer than predetermined (e.g., 1 millisecond). This control is exercised in an embodiment in which the write current is decreased in a single step.

The write current may be increased/decreased in multiple steps depending on the number of write operation interruptions (multiple-step write current control). When a writing sequence shown in FIG. 1 is set for each magnetic head 101, the magnetic disk drive having a plurality of magnetic heads 101 can absorb the thermal expansion time differences among individual units of the magnetic head 101.

Alternatively, the write current may be set to a relatively great initial value, and decreased after a predetermined period of time elapses or a predetermined number of sectors are written. The same advantages can be obtained by the use of this alternative method. Also in this case, the increase/decrease in the write current includes an increase/decrease in the overshoot.

Figure 4:
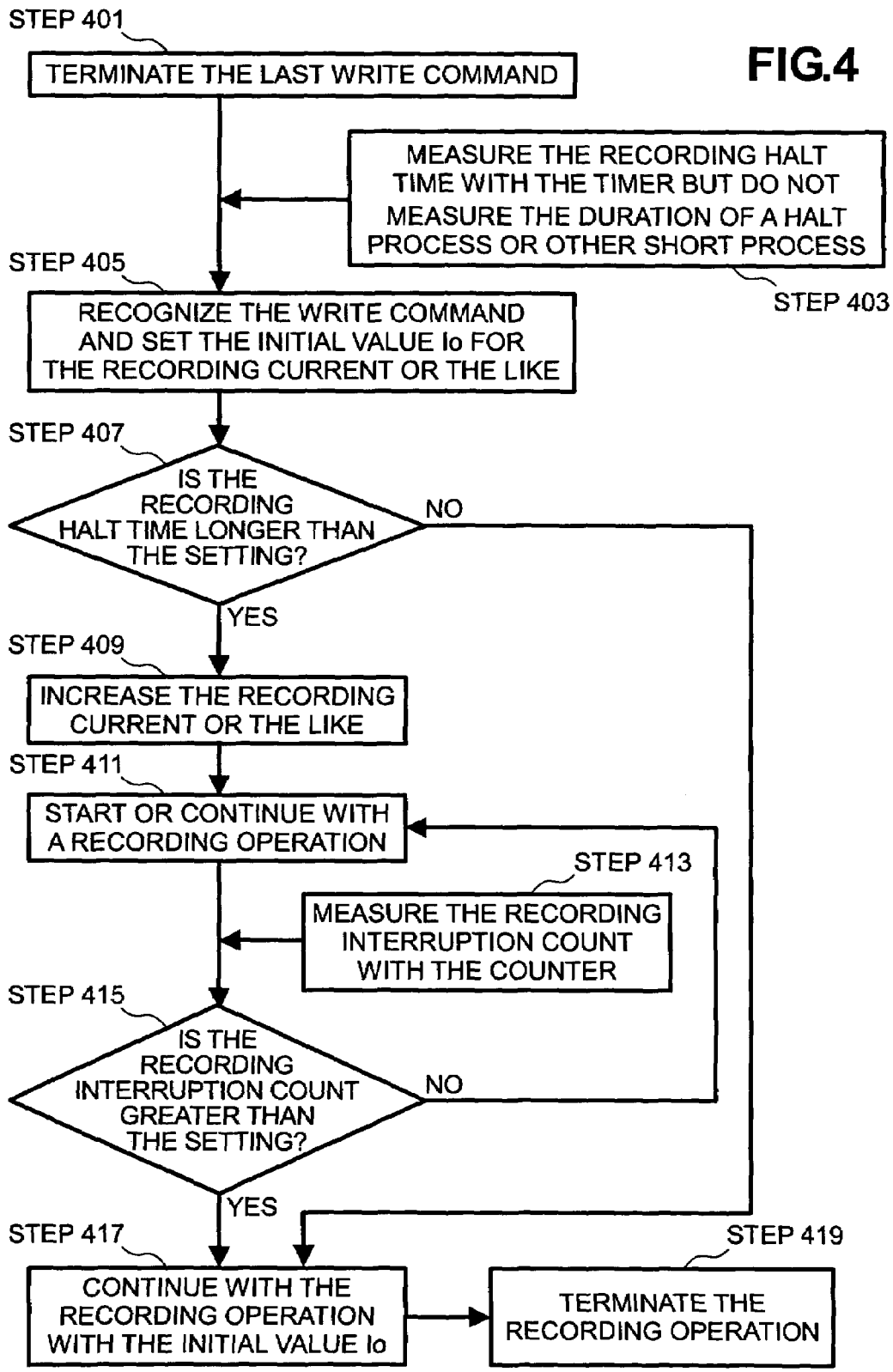
FIG. 4 is a flowchart that illustrates how control is exercised when the write current or the like is set to a relatively small initial value.

FIG. 4 is a flowchart that illustrates how control is exercised to increase the write current or overshoot (hereinafter abbreviated to the write current or the like) at an early stage of a write operation. While a predetermined write halt time is measured (step 403) since the termination of the last write command (step 401), a write command is received and a predetermined initial value $I_0$ for the write current or the like is set (step 405). If the write halt time exceeds its setting (step 407), the write current or the like is increased (step 409) and then a write operation starts (step 411).

If the write operation interruption count measured by the counter (step 413) exceeds the setting (step 415), the write operation continues with the write current value decreased to the initial value $I_0$ (step 417). If the write halt time is found in step 407 to be shorter than the setting, the write operation also continues using the initial value $I_0$ (step 417). If the measured count is found in step 415 to be not greater than the setting, the write operation continues (step 411). When the specified amount of information is written, the write sequence terminates (step 419).

When the overshoot is controlled for individual information segments, the writing inadequacy resulting from the transient phenomenon of the writing capacity can be compensated for. Further, the write current or the like may be increased/decreased when the timer indicates a specified time elapse after the start of writing instead of measuring the number of write operation interruptions with the counter to control the increase/decrease in the write current or the like.

Figure 5:
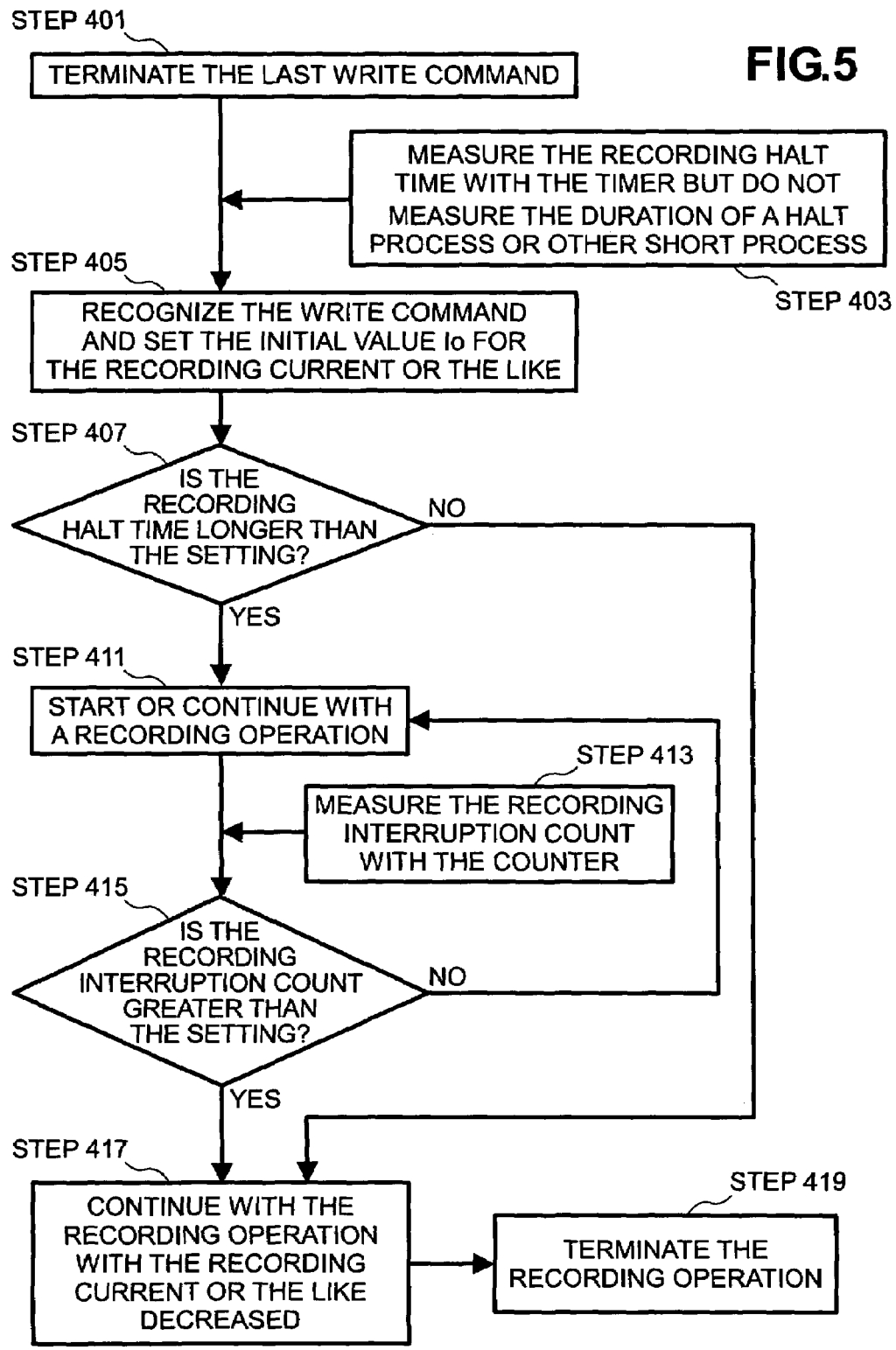
FIG. 5 is a flowchart that illustrates how control is exercised when the write current or the like is set to a relatively great initial value.

FIG. 5 is a flowchart that illustrates how control is exercised to decrease the write current or the like at a later stage of a write operation. While a predetermined write halt time is measured (step 403) since the termination of the last write command (step 401), a write command is received and a predetermined initial value $I_0$ for the write current or the like is set (step 405). This initial value is greater than the counterpart indicated in FIG. 4.

If the write halt time exceeds its setting (step 407), a write operation starts (step 411). If the write operation interruption count measured by the counter (step 413) exceeds the setting (step 415), the write operation continues with the write current value or the like decreased below the initial value $I_0$ (step 417). If the write halt time is found in step 407 to be shorter than the setting, the write operation also continues with the write current value or the like decreased below the initial value $I_0$ (step 417).

If the measured count is found in step 415 to be not greater than the setting, the write operation continues (step 411). When the specified amount of information is written, the write sequence terminates (step 419). Further, the write current or the like may be increased/decreased when the timer indicates a specified time elapse after the start of writing instead of measuring the number of write operation interruptions with the counter to control the increase/decrease in the write current or the like.

While the above is a complete description of specific embodiments of the invention, various modifications, alternative constructions, and equivalents may be used. Therefore, the above description should not be taken as limiting the scope of the invention as defined by the claims.

What is claimed is:

1. A method of controlling a write current in a magnetic disk drive, the method comprising:
    receiving a write command to initiate a present write operation; and
    if a predetermined period of time has elapsed since a most recent write operation terminated,
      applying a given write current to a write head coil at the beginning of the present write operation, and
      decreasing the write current during the present write operation in multiple steps the number of which depends on the number of recording operation interruptions, wherein the write current is less than the given write current at the end of the write operation; or
    if said predetermined period of time has not elapsed since the most recent write operation terminated, applying a write current less than the given write current at the beginning of the present write operation.

2. A method of controlling a write current in a magnetic disk drive, the method comprising:
    receiving a write command to initiate a present write operation; and
    if a predetermined period of time has elapsed since a most recent write operation terminated,
      applying a first write current to a write head coil during a first portion of the present write operation, and
      applying a second write current during a second later portion of the present write operation, wherein the first write current is higher than the second write current, the write current being decreased from the first write current to the second write current in multiple steps the number of which depends on the number of recording operation interruptions; or
    if said predetermined period of time has not elapsed since a most recent write operation terminated, applying the second write current during the first and second portions of the present write operation.

3. The method of claim 2 wherein the first and second write currents are maintained at respective constant levels during the first and second portions of the write operation.

4. The method of claim 2 wherein the first write current is achieved by increasing an amount of overshoot during the first portion of the write operation relative to the amount of overshoot during the second portion of the time interval.

5. The method of claim 2 wherein said predetermined period of time is between several tens of microseconds and a millisecond.

6. The method of claim 2 wherein:
    the write current applied to the write head coil is specified by a register value; and
    the register value is set to specify the first write current after said predetermined period of time has elapsed.

7. A magnetic disk drive comprising:
    a magnetic disk that rotates during operation;
    a write head having a coil through which a write current is passed during a write operation; and
    a write current control circuit that causes said write current to decrease in multiple steps, the number of which depends on the number of recording operation interruptions, during a write operation so that for an initial portion of the write operation, the write current being higher than the write current for an ending portion of the write operation.

8. The magnetic disk drive of claim 7 wherein the initial portion is defined by a predetermined number of sectors.

9. The magnetic disk drive of claim 7 wherein the write current is held at a first value for a first portion of the write operation and then at a second, lower value following the first portion of the write operation.

10. A magnetic disk drive using a magnetic head for energizing a coil when information targeted for storage is divided into specified segments and is written onto a magnetic disk medium,
    wherein said magnetic disk drive has means for setting the value of write current to be supplied to the coil for each of said specified segments and recording information while varying the write current in multiple steps, the number of which depends on the number of recording operation interruptions, during a writing sequence.

11. The magnetic disk drive of claim 10 wherein said specified segments are sectors.

12. The magnetic disk drive of claim 10 wherein said magnetic disk drive has a function of setting an overshoot instead of setting said write current and records the information at various settings for said write current by varying the overshoot.

* * * * *